(12) United States Patent  
Proutiere

(10) Patent No.: US 8,876,047 B2  
(45) Date of Patent: Nov. 4, 2014

(54) HARPOON HEAD AND CORRESPONDING HARPOON

(75) Inventor: Séverine Proutiere, Magnac sur Touvre (FR)

(73) Assignee: DCNS, Paris (FR)

( * ) Notice: Subject to any disclaimer, the term of this patent is extended or adjusted under 35 U.S.C. 154(b) by 765 days.

(21) Appl. No.: 13/055,039

(22) PCT Filed: Jul. 17, 2009

(86) PCT No.: PCT/FR2009/051430  
§ 371 (c)(1),  
(2), (4) Date: Jun. 9, 2011

(87) PCT Pub. No.: WO2010/010279  
PCT Pub. Date: Jan. 28, 2010

(65) Prior Publication Data  
US 2011/0233332 A1 Sep. 29, 2011

(30) Foreign Application Priority Data

Jul. 21, 2008 (FR) ...................................... 08 54938

(51) Int. Cl.  
*B64F 1/26* (2006.01)  
*B64F 1/12* (2006.01)

(52) U.S. Cl.  
CPC ...................................... *B64F 1/125* (2013.01)  
USPC ............... 244/114 B; 244/151 R; 244/151 A; 244/147; 244/148; 244/115; 224/153

(58) Field of Classification Search  
USPC ................. 244/151 R, 151 A, 147–148, 115; 224/153  
See application file for complete search history.

(56) References Cited

U.S. PATENT DOCUMENTS

| 1,940,430 | A | * | 12/1933 | Morterra | .......................... 52/160 |
| 3,151,826 | A | | 10/1964 | Michel | |
| 3,502,286 | A | * | 3/1970 | Warren | ...................... 244/17.17 |
| 4,031,840 | A | * | 6/1977 | Boisrayon et al. | ............... 114/51 |
| 4,177,964 | A | * | 12/1979 | Hujsak et al. | ............... 244/172.4 |
| 4,195,804 | A | * | 4/1980 | Hujsak et al. | ............... 244/172.4 |
| 4,588,150 | A | * | 5/1986 | Bock et al. | ................. 244/172.4 |
| 5,080,304 | A | * | 1/1992 | Stump et al. | ................... 244/115 |
| 5,141,520 | A | * | 8/1992 | Goble et al. | .................... 606/232 |
| 5,480,108 | A | * | 1/1996 | Amiand et al. | ................ 244/115 |
| 5,522,844 | A | * | 6/1996 | Johnson | ......................... 606/232 |
| 5,735,488 | A | * | 4/1998 | Schneider | .................. 244/172.4 |
| 6,176,519 | B1 | * | 1/2001 | Limingoja | .................... 280/762 |
| 6,969,030 | B1 | * | 11/2005 | Jones et al. | ................. 244/172.5 |
| 7,104,505 | B2 | * | 9/2006 | Tchoryk et al. | ............ 244/172.4 |

(Continued)

FOREIGN PATENT DOCUMENTS

EP        0611693 A1      8/1994  
EP        0631930 A1      1/1995

(Continued)

OTHER PUBLICATIONS

International Search Report, dated Jan. 14, 2010, from corresponding PCT application.

*Primary Examiner* — Luke Ratcliffe  
*Assistant Examiner* — Assres H Woldemaryam  
(74) *Attorney, Agent, or Firm* — Young & Thompson

(57) ABSTRACT

A harpoon head (6) for a system for anchoring an aircraft on a grating (4) is characterized in that a distal end of the harpoon head has an interchangeable insert (20).

18 Claims, 2 Drawing Sheets

(56) References Cited

U.S. PATENT DOCUMENTS 7,114,681 B2 * 10/2006 Muylaert et al. .............. 244/115
7,497,053 B2 *  3/2009 Nicolet ........................... 52/161
7,857,261 B2 * 12/2010 Tchoryk et al. ............ 244/172.4
8,491,600 B2 *  7/2013 McDevitt et al. ............... 606/99

FOREIGN PATENT DOCUMENTS

| FR | 2701689 A1 | 8/1994 |
| GB | 1177751 A | 1/1970 |
| NL | 6602621 A | 6/1966 |
| WO | 9104910 A1 | 4/1991 |

* cited by examiner

HARPOON HEAD AND CORRESPONDING HARPOON

BACKGROUND OF THE INVENTION

1. Field of the Invention

The present invention relates to a system for anchoring an aircraft on a grating. More particularly, the invention relates to an anchoring system of the type including a harpoon carried by the aircraft and actuated so that a harpoon head becomes anchored in a cell of the grating.

2. Description of the Related Art

Document FR 2 701 689 A1 describes a harpoon equipping an aircraft and able to be pulled towards a landing grating of the aircraft so that the head of the harpoon is fastened on the grating and forms an anchoring point of the aircraft, facilitating the landing operation of the aircraft. According to this document, the harpoon head includes a cylindrical central portion of axis A, and a conical end portion. The central portion includes fingers radially oriented and radially movable between a retracted position and an extended position. The harpoon head also includes means for driving the fingers and keeping them in the extended position in response to the penetration of the harpoon head in a cell of the grating, such that the fingers protrude below the grating and prevent the disengagement of the harpoon.

When the harpoon is fired, there is a high probability that the distal end of the harpoon head will come into contact with an edge surface of the grating, defined by the set of collars separating neighboring cells of the grating. The movement of the harpoon being essentially normal at the edge surface of the grating, the harpoon rebounds on the grating and the anchoring of the aircraft does not occur. It is necessary to restart the anchoring system before trying a new landing phase of the aircraft.

Moreover, during use of the harpoon, the repetition of shocks between the harpoon head and the grating ends up dulling the distal end of the harpoon head. The latter part flattens, such that the harpoon head has an end face which is normal to the axis of the harpoon. In return, the presence of this end face increases the likelihood of the harpoon head coming into contact with the stop surface of the grating. When the harpoon head is too worn for effective anchoring, it is then necessary to replace it, which, given its complex structure, represents a significant cost.

BRIEF SUMMARY OF THE INVENTION

The invention aims to offset the aforementioned drawbacks.

To that end, the invention relates to a harpoon head for a system for anchoring an aircraft on a grating, characterized in that a distal end of the harpoon has an interchangeable insert.

According to one particular embodiment of the invention, the harpoon head includes one or several of the following features, considered alone or according to all technically possible combinations:

- the insert has a suitable shape for the harpoon head to be able to slide on a stop surface of the grating to be housed in a cell of the grating;
- the insert is cylindrical, and has a beveled end so as to give the insert an tilted contact face with the grating;
- the axis B of the insert is confounded with an axis of the harpoon head;
- one edge of the insert connecting the tilted face and a lateral surface of the insert is rounded, and the radius of the rounded edge is smaller than two millimeters;
- the insert is made from a metal material having a hardness greater than that of the material making up the harpoon head, preferably a steel, and more preferably made from a 30CrMo12 formula steel;
- the distal end of the harpoon head includes a housing for receiving the insert;
- the harpoon head includes a fastening means capable of cooperating with conjugate fastening means provided on the insert to fasten the insert on the harpoon head interchangeably.

The invention also relates to a harpoon characterized in that it is provided with a harpoon head like the one just defined.

BRIEF DESCRIPTION OF THE DRAWINGS

The invention and the advantages thereof will be better understood upon reading the following description, provided solely as an example and done in reference to the appended drawings, in which.

DETAILED DESCRIPTION OF THE PREFERRED EMBODIMENTS

Figure 1:
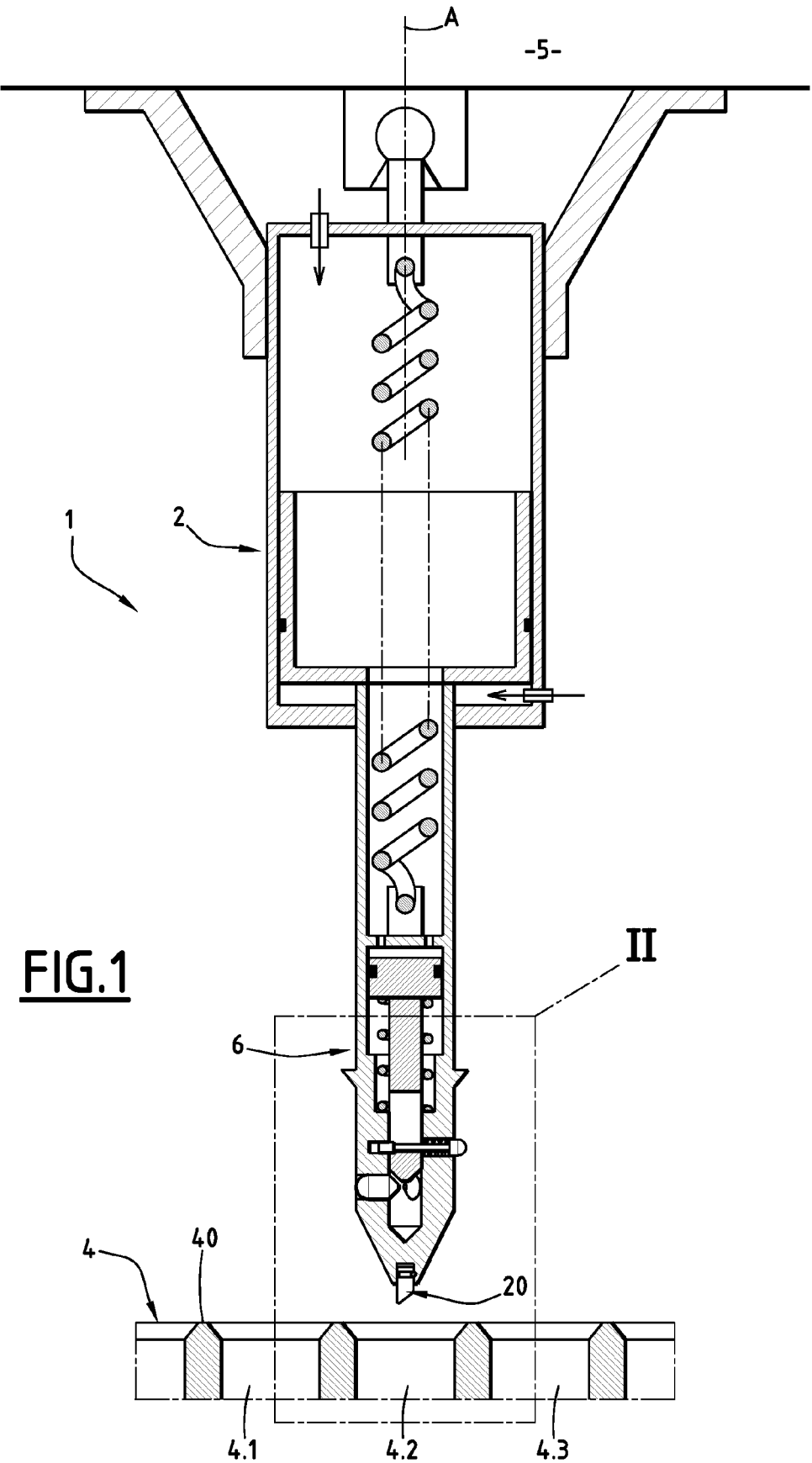
FIG. 1 is a general view of an anchoring system including a harpoon and a grating.

In reference to FIG. 1, a system 1 for anchoring an aircraft on a deck includes a harpoon 2 and a grating 4. The grating 4 has a planar upper surface including a plurality of cells 4.1, 4.2, 4.3. The harpoon 2 is positioned under the fuselage 5 of the aircraft, while the grating 4 is positioned on the pontoon on which the aircraft can land. The harpoon 2 has an oblong shape along an axis A. A distal end of the harpoon 2, situated away from the aircraft 5 carrying the harpoon 2, is provided with a harpoon head 6 capable of cooperating with a cell 4.1, 4.2, 4.3 of the grating 4, during the anchoring operation of the aircraft.

In order to immobilize the aircraft on the deck, the harpoon is fired after the approach phase, once the aircraft comes back into contact with the deck.

The harpoon head 6 becomes housed in one of the cells of the grating 4. At that moment, an anchoring means is actuated to prevent the withdrawal of the harpoon head 6 from the cell. Thus anchored, the landing of the aircraft 5 finishes with the retraction of the harpoon 2 in synchronization with the stopping of the propulsion system of the aircraft 5.

The harpoon head 6 has a central portion 7, substantially cylindrical around the axis A, and a substantially conical end portion 8. The harpoon head 6 is connected, by its central portion 7, to the harpoon body 2. The diameter of the conical portion 8 of the harpoon head 6 decreases as one moves along the axis A, oriented from the fuselage 5 of the aircraft towards the grating 4, i.e. from top to bottom in FIG. 1.

The conical portion 8 ends with a distal end face 10 that is normal to the axis A. The distal end face 10 is provided with a bore 12 with axis A. The bore 12 constitutes a housing for receiving a insert 20 that will now be described in detail.

Figure 2:
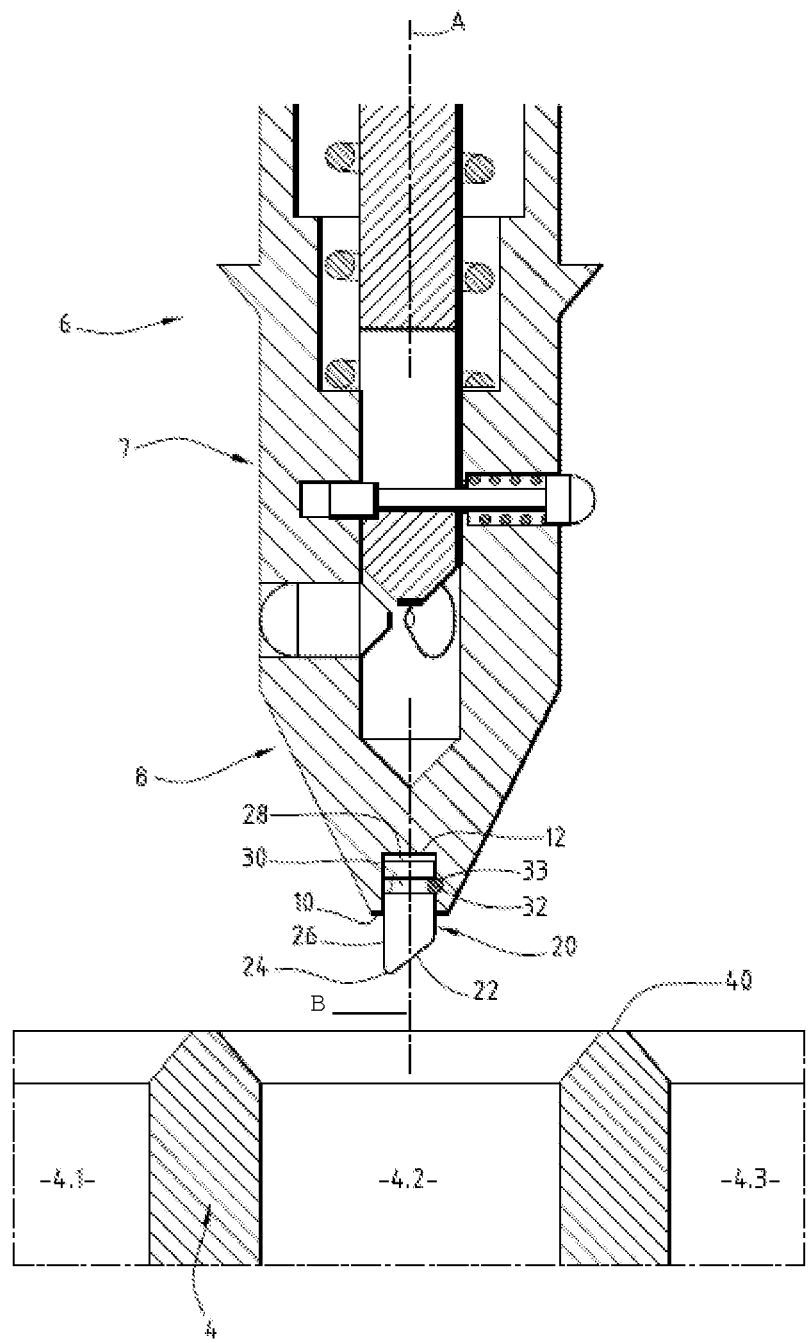
FIG. 2 is an axial cross-section of a harpoon head of the harpoon of FIG. 1.

In reference to FIG. 2, the insert 20 is a wearing part attached on the harpoon head 6. The dowel 20 is cylindrical in revolution around an axis B. The insert 20 is housed in the bore 12 of the harpoon head 6 such that the axis B coincides with the axis A. One end of the insert 20, intended to extend outside the bore 12 to be able to come into contact with the grating 4, is beveled so that the insert 20 is provided with a tilted face 22 relative to the axis A.

A junction edge 24 between the tilted face 22 and the lateral surface 26 of the insert 20 is rounded. The edge 24 has a radius of curvature smaller than two millimeters and preferably equal to one millimeter.

The other end of the insert 20 has a radial end face 28, i.e. normal to the axis B, intended to be situated opposite the bottom of the bore 12.

To fasten the insert 20 to the harpoon head 6, the insert 20 includes a fastening means capable of cooperating with a conjugate fastening means provided on the harpoon head 6. In the embodiment described in the figures, near the radial face 28, the lateral surface 26 of the insert 20 includes a semi-circular groove 30. Moreover, the harpoon head 6 is provided with an elastic pin 32 housed in a hole 33 passing all the way through the end portion 8. An axis of the through hole 33 is perpendicular to the axis A and is tangent to the bore 12, at the height of the groove 30 of the insert 20. In the assembled position of the insert 20 on the harpoon head 6, the pin 32, inserted into the through hole 33, cooperates with the groove 30. Thus, the dowel 20 is prevented from leaving the bore 12 by a translational movement along the axis A, but is free in rotation around the axis A.

Such fastening means make it possible to easily change the insert 20. The insert 20 is made from a metal material having a high hardness relative to the material making up the harpoon head 6. For example, a 30CrMo12 formula steel is used for the dowel 20.

During an attempt at anchoring the aircraft on the grating 4, the harpoon is fired towards the grating 4. If the harpoon head 6 must come into contact with the grating 4, it does so via the insert 20. In the unfavorable case where the tilted face 22 of the insert 20 comes into contact with an edge surface 40 of the grating 4, defined by the collars separating neighboring cells, such as cells 4.1 and 4.2, the contact between the tilted face 22 and the stop surface 40 occurs along the rounded edge 24. The harpooning force being oriented along the axis A, the contact point is outside the axis A. A torque is then generated that tends to make the harpoon head 6 tilt, in a vertical plane, around the contact point until the contact between the insert 20 and the edge surface 40 occurs along the plane of the inclined face 22 of the insert 20. Then, the angle between the tilted face 22 and the axis A is adapted so that the harpoon 2 slides on the edge surface 40 to be housed in one or the other of the cells 4.1 and 4.2.

Possibly, upon contact of the insert 20 with the edge surface 40, a torque around the axis A allows the insert 20 to rotate in the bore 12, around the axis A, so as to come into contact with the edge surface 40 on the majority of the inclined face 22.

The invention claimed is:

1. A harpoon head for a harpoon anchoring an aircraft on a grating, the harpoon having an oblong shape along a longitudinal axis, the harpoon head comprising:
a distal end of the harpoon head situated away from the aircraft along the longitudinal axis, the distal end having an interchangeable insert that is a wearing part attached on the harpoon head, the harpoon head being configured to come into contact with the grating via the interchangeable insert when the harpoon is fired from the aircraft towards the grating and impacts the grating.

2. The harpoon head according to claim 1, wherein the insert has a shape adapted for the harpoon head to be able to slide on an edge surface of the grating to be housed in a cell of the grating.

3. The harpoon head according to claim 2, wherein the insert is cylindrical, and has a beveled end so as to give the insert a tilted contact face with respect to the grating.

4. The harpoon head according to claim 3, wherein an axis of the insert coincides with an axis of the harpoon head.

5. The harpoon head according to claim 3, wherein one edge of the insert connecting a tilted face and a lateral surface of the insert is rounded, and the radius of the rounded edge is less than two millimeters.

6. The harpoon head according to claim 1, wherein the insert is made from a metal material having a hardness greater than that of the material making up the harpoon head.

7. The harpoon head according to claim 1, wherein the distal end of the harpoon head includes a housing configured to receive the insert.

8. The harpoon head according to claim 1, wherein the harpoon head includes a first means for fastening configured to cooperate with conjugate means for fastening provided on the insert to fasten the insert on the harpoon head interchangeably.

9. A harpoon configured to cooperate with a grating for a system for anchoring an aircraft, the harpoon comprising:
the harpoon head according to claim 1.

10. The harpoon head according to claim 4, wherein one edge of the insert connecting a tilted face and a lateral surface of the insert is rounded, and the radius of the rounded edge is less than two millimeters.

11. The harpoon head according to claim 1, wherein the metal material is a steel.

12. The harpoon head according to claim 11, wherein the steel is a 30CrMo12 formula steel.

13. The harpoon head according to claim 1, wherein the interchangeable insert provided at the distal end of the harpoon head is at a distal-most portion of the harpoon head.

14. The harpoon head according to claim 1, further comprising:
a central portion, substantially cylindrical around the longitudinal axis; and
a substantially conical end portion, a tip of the end portion constituting the distal end of the harpoon head.

15. The harpoon head according to claim 14, wherein the harpoon head is connected to the harpoon body by the central portion.

16. The harpoon head according to claim 1, further comprising means for anchoring which is actuated to prevent withdrawal of the harpoon head from the grating.

17. The harpoon head according to claim 16, wherein the means for anchoring comprises fingers radially oriented and radially movable between a retracted position and an extended position, the harpoon head including means for driving the fingers and keeping the fingers in the extended position in response to penetration of the harpoon head in a cell of the grating such that the fingers protrude below the grating and prevent disengagement of the harpoon.

18. The harpoon head according to claim 17, further comprising:
a central portion, substantially cylindrical around the longitudinal axis; and
a substantially conical end portion, a tip of the end portion constituting the distal end of the harpoon head, the means for anchoring being included in the central portion of the harpoon head.

* * * * *